United States Patent [19]

Lutz et al.

[11] 4,204,592

[45] * May 27, 1980

[54] LOADING AND UNLOADING APPARATUS FOR VEHICLES

[76] Inventors: David W. Lutz; David E. Lutz, both of P.O. Box 39, Carlisle, Pa. 17013

[*] Notice: The portion of the term of this patent subsequent to Apr. 4, 1995, has been disclaimed.

[21] Appl. No.: 897,961

[22] Filed: Apr. 3, 1978

Related U.S. Application Data

[63] Continuation of Ser. No. 679,600, Apr. 23, 1976, Pat. No. 4,082,196.

[51] Int. Cl.² .............................................. B65G 19/20
[52] U.S. Cl. ..................................................... 198/750
[58] Field of Search ............... 414/499, 500, 510, 514, 414/521, 525, 527, 528; 198/750, 817

[56] References Cited

U.S. PATENT DOCUMENTS

| | | | |
|---|---|---|---|
| 2,815,874 | 12/1957 | Kowal | 414/521 X |
| 3,212,657 | 10/1965 | Murfitt et al. | 198/817 |
| 3,272,358 | 9/1966 | Thompson | 414/528 X |
| 3,289,818 | 12/1966 | Kittredge | 414/509 |

Primary Examiner—Robert G. Sheridan
Attorney, Agent, or Firm—Edward E. Dyson; John J. Byrne

[57] ABSTRACT

This invention relates to a loading and unloading apparatus for a load-carrying vehicle. The arrangement includes a plurality of cables which are laid on the floor of the vehicle and which support loads placed thereon. The cables can be moved in either longitudinal direction on the vehicle floor whereby loads supported on the cables are moved along the vehicle floor to facilitate loading and unloading of the vehicle. The cables are for all practical purposes endless and have a load supporting run and a return run. The return run is so arranged as to not interfere with the understructure of the vehicle and the fifth wheel connection, in the case of a trailer of a tractor-trailer rig. The cables are driven by means of a driven bulkhead which is connected to the cables and which is, in turn, driven by a chain drive mechanism.

14 Claims, 12 Drawing Figures

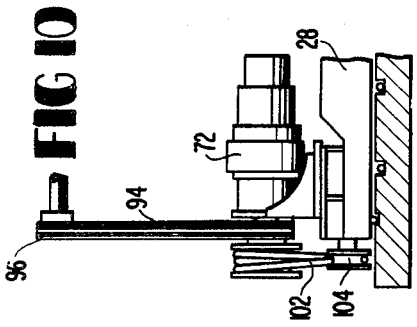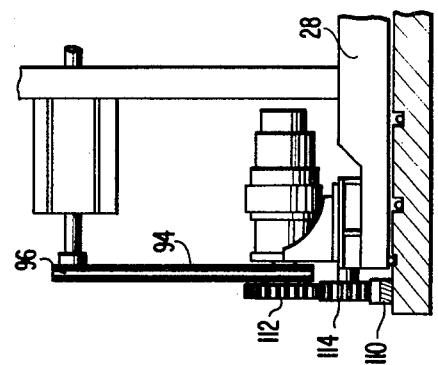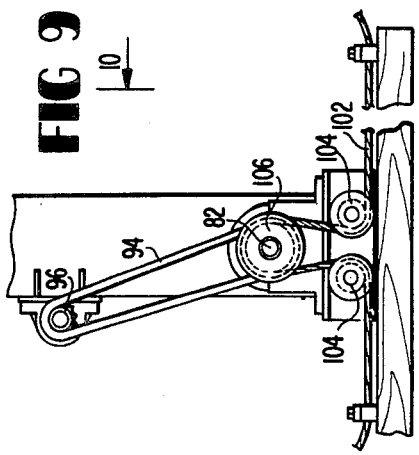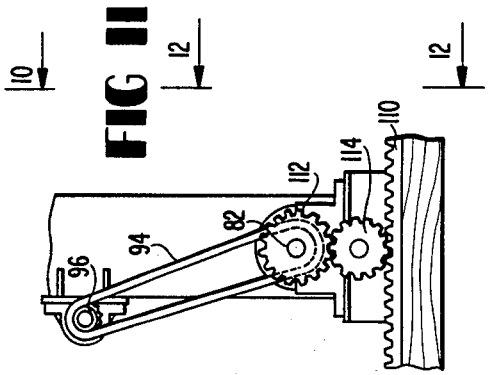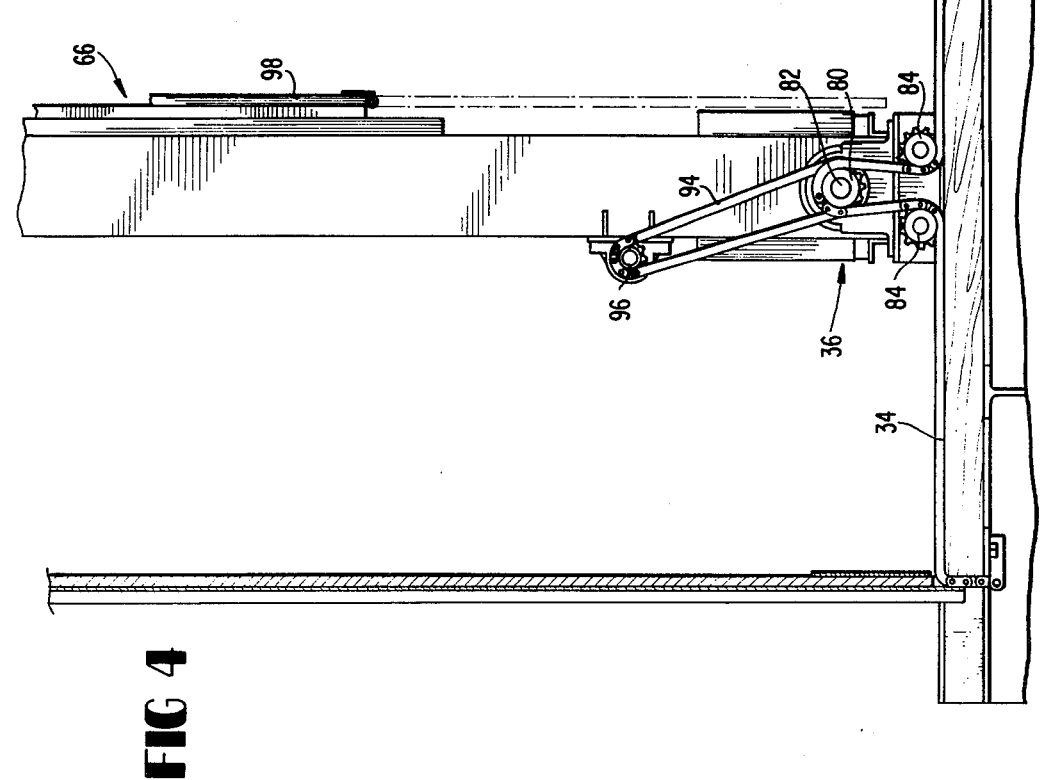

LOADING AND UNLOADING APPARATUS FOR VEHICLES

This is a continuation of application Ser. No. 679,600, filed Apr. 23, 1976 now U.S. Pat. No. 4,082,196, Apr. 4, 1978.

FIELD OF THE INVENTION

This invention relates to a loading and unloading apparatus for a vehicle such as a van or tractor trailer or the like, although it is to be understood that the apparatus has utility in any environment where loads are required to be moved from one position to another whether it be on a warehouse floor, in a railroad car or in the hold of a ship. More particularly, this invention relates to a flexible cable type of loading and unloading apparatus wherein power driven cables are laid on the vehicle floor and support loads placed thereon. When the cables are moved along the vehicle floor, the loads supported thereby are also moved.

BACKGROUND OF THE INVENTION

This invention lies in a highly developed area of the art relating to apparatus for facilitating the loading and unloading of vehicles and the handling of loads within the confines of the vehicles. For the most part, the prior art apparatus provides means whereby loads are actually lifted off of the supporting surface and transferred either into or out of the vehicle. Accordingly, the power and structural requirements of such apparatus are extremely high if the apparatus is to operate efficiently for any substantial period of time. The purpose of this invention is to provide a more simplified apparatus for loading and unloading vehicles having minimum power and structural requirements.

Under the general concept of the invention, power-driven cables are stretched over the vehicle floor from front to rear and are movable in either direction in unison. A plurality of cables are used and spaced laterally of the vehicle. The number of cables which are to be used depends upon the size and type load to be handled. The loads are placed directly on the cables and the cables are actuated to shift the loads from front to rear or vice versa as the case may be. The cables ride on the vehicle floor, however, the frictional contact is only a line contact and is substantially less than the contact which would occur if the loads were placed directly on the floor.

The invention disclosed herein is an improvement over prior art arrangements primarily in the drive system employed and in the manner in which the cables are installed in an existing vehicle without any significant modification to the vehicle.

At least two others in the prior art have patented generally similar systems for vehicles. U.S. Pat. No. 3,272,358, entitled TRUCK UNLOADING STRUCTURE, dated Sept. 13, 1966, to F. Thompson. Thompson discloses the general concept of using cables on a vehicle floor to shift loads therein. However, his arrangement has little utility except for relatively small loads. Thompson employs a plurality of endless cables stretched over a friction surface roll and idlers rolls. The friction roll is driven by a suitable power source. It is quite apparent, however, that the frictional contact between the roll and cable would not be sufficient to move loads of any appreciable size and weight. Further, Thompson's particular arrangement of pulleys for supporting the cables is unsuitable for use in trailers having fifth wheel assemblies thereon. In U.S. Pat. No. 2,815,874 to Kowal, a drive system more positive than that of Thompson is employed. Endless chains drive a bulkhead which in turn drives the cables. However, the drive system and cable arrangement of Kowal would require modification of the understructure of the vehicle and makes no allowance for a fifth wheel connection.

Further, this invention constitutes an improvement over the arrangement disclosed in applicant's copending application Ser. No. 543,608, filed Jan. 23, 1975, now abandoned entitled LOADING AND UNLOADING APPARATUS FOR VEHICLES.

Other arrangements found in the prior art use movable flexible planar sheets or floors covering substantially the entire area of the vehicle load-supporting floor. The sheets are wound onto takeup reels positioned on the vehicle. The deficiencies of such arrangements are quite apparent in that use of such movable sheets or the like provides no relief from substantial frictional contact with the underlying floor of the vehicle.

The movable sheet-type arrangements are cumbersome and do not lend themselves to ready adaptability to existing truck bodies, and are likewise unsuitable for use with trailers having fifth wheel coupling assemblies. Also, such arrangements generally render the vehicle inoperative for loading or unloading by using a forklift truck, for example, wherein the truck must enter the vehicle. The cables in the invention do not impede the movement of a forklift across the vehicle floor nor will they be damaged thereby.

SUMMARY OF THE INVENTION

In a preferred embodiment of this invention, substantially endless strands, preferably cables, are mounted longitudinally on the floor of a vehicle. First and second sets of pulleys are mounted at each end of the vehicle for receiving the cables. Each of the cables has a load-supporting run which has a load supporting surface extending at least partially above the surface of the floor. The pulleys are so arranged that the other or return runs of the cables are also on the top surface of the floor, or slightly recessed therein, but are below the load-supporting surface of the load-supporting runs of the cables. In some prior art devices employing cable-type arrangements, the return run runs under the floor requiring the use of protective tubing and/or the boring of holes or passageways in the floor supporting understructure. Further, those that have used such arrangements have not taken into account the interference problems caused by a "fifty-wheel" connection.

In this invention, since the runs of the cables are above the floor, the fifth wheel connection causes no problems and no modifications have to be made to the floor understructure.

A connecting bar or beam extends laterally of the vehicle and is connected to a run of each of the cables. In a preferred embodiment, a sprocket and chain drive arrangement drives the beam longitudinally of the vehicle thereby moving the cables and the loads supported thereon longitudinally of the vehicle. Alternate drive means disclosed herein include a rack and pinion drive and a cable and winch drive. The drive means includes power means, preferably, a hydraulic motor, which is mounted on the beam for movement therewith. It is to be understood that any other drive means such as an electric motor or an internal combustion engine may be employed. The beam can be provided with a bulkhead portion to assist in moving loads.

Essentially, the entire system can be installed in an existing vehicle with a minimum of modification to the vehicle. The drive means, for all practical purposes, is self-contained as are the pulleys mounted on the rear of the vehicle. Those pulleys are mounted in a housing which is readily affixed to the rear of the vehicle.

An objective of this invention is to provide a simplified loading and unloading apparatus for vehicles requiring a relatively low power output for efficient operation.

Further, it is an objective of this invention to provide a loading and unloading apparatus which may be readily installed in existing truck bodies with a minimum of modifications to the truck body.

It is another objective of this invention to combine with a cable-type loading and unloading apparatus of this invention a movable bulkhead which is affixed to the cables and which is driven longitudinally of the vehicle by power means mounted on said bulkhead.

It is another objective of this invention to provide a loading and unloading apparatus which may be marketed in a compact package and readily installed by the vehicle owner.

It is a further objective of this invention to provide a cable-type loading and unloading system wherein the cables are arranged such that the runs thereof are substantially entirely on top of the vehicle floor, thereby eliminating the need for modifying the understructure of the vehicle in any manner and permitting the fifth wheel to be avoided.

BRIEF DESCRIPTION OF THE DRAWINGS

These and other objects of the invention will become more apparent to those skilled in the art by reference to the following detailed description when viewed in light of the accompanying drawings wherein:

FIG. 4 is a view taken on lines 4—4 of FIG. 3;

FIG. 7 is a fragmentary view taken on lines 7—7 of FIG. 2;

FIG. 8 is a view taken on lines 8—8 of FIG. 2;

FIG. 9 is a side view in elevation of a modified form of the bulkhead drive means of this invention;

FIG. 10 is a fragmentary view taken on lines 10—10 of FIG. 9;

FIG. 11 is a side view in elevation of another modified form of the bulkhead drive means of the invention; and FIG. 12 is a view taken on lines 12—12 of FIG. 11.

DETAILED DESCRIPTION OF THE EMBODIMENTS

Figure 1:
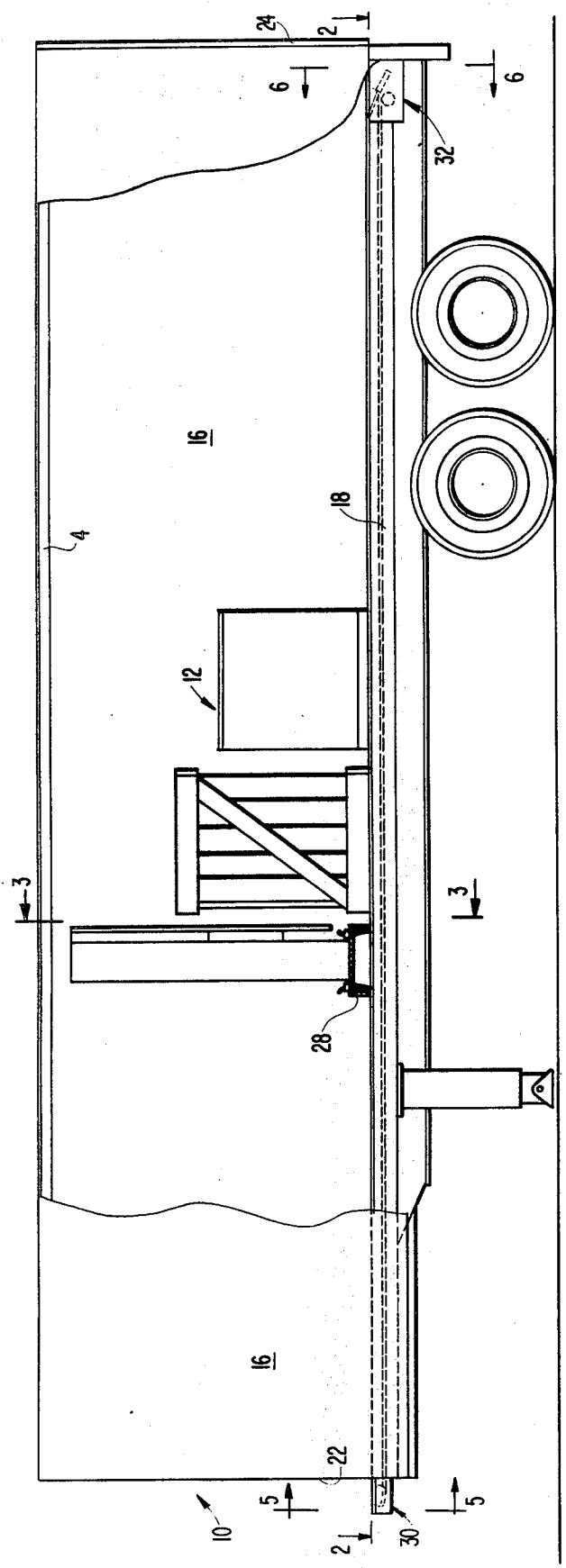
FIG. 1 is a side view in elevation of a conventional trailer equipped with the loading and unloading apparatus of this invention.

Referring now to the drawings wherein like numerals indicate like parts, a truck, in this instance the trailer of a tractor-trailer rig, is generally indicated by the numeral 10 and is loaded with a plurality of items, generally indicated by the numeral 12, hereinafter referred to as the load or loads. The trailer is provided with a ceiling 14, side walls 16, and a floor 18, having a top surface 20. For purposes of orientation, the end 22 of the trailer will be referred to as the front end and the end 24 will be referred to as the rear end. The end 24 is the loading end and the end 22 includes the fifth wheel connection assembly (not shown).

The trailer 10 is provided with the loading and unloading apparatus of this invention which comprises the following general parts: (a) a set of identical substantially endless load supporting cables 26 extending longitudinally of the vehicle; (b) a beam 28 extending substantially the width of the vehicle and suitably connected to the cables 26; (c) front and rear pulley units 30 and 32, respectively; and (d) a means for driving the beam (and, therefore, the cables connected thereto), which drive means includes chain strips 34 affixed to the floor of the vehicle, and a sprocket 36 on the beam 28 adapted to interengage with the chain strips.

Figure 2:
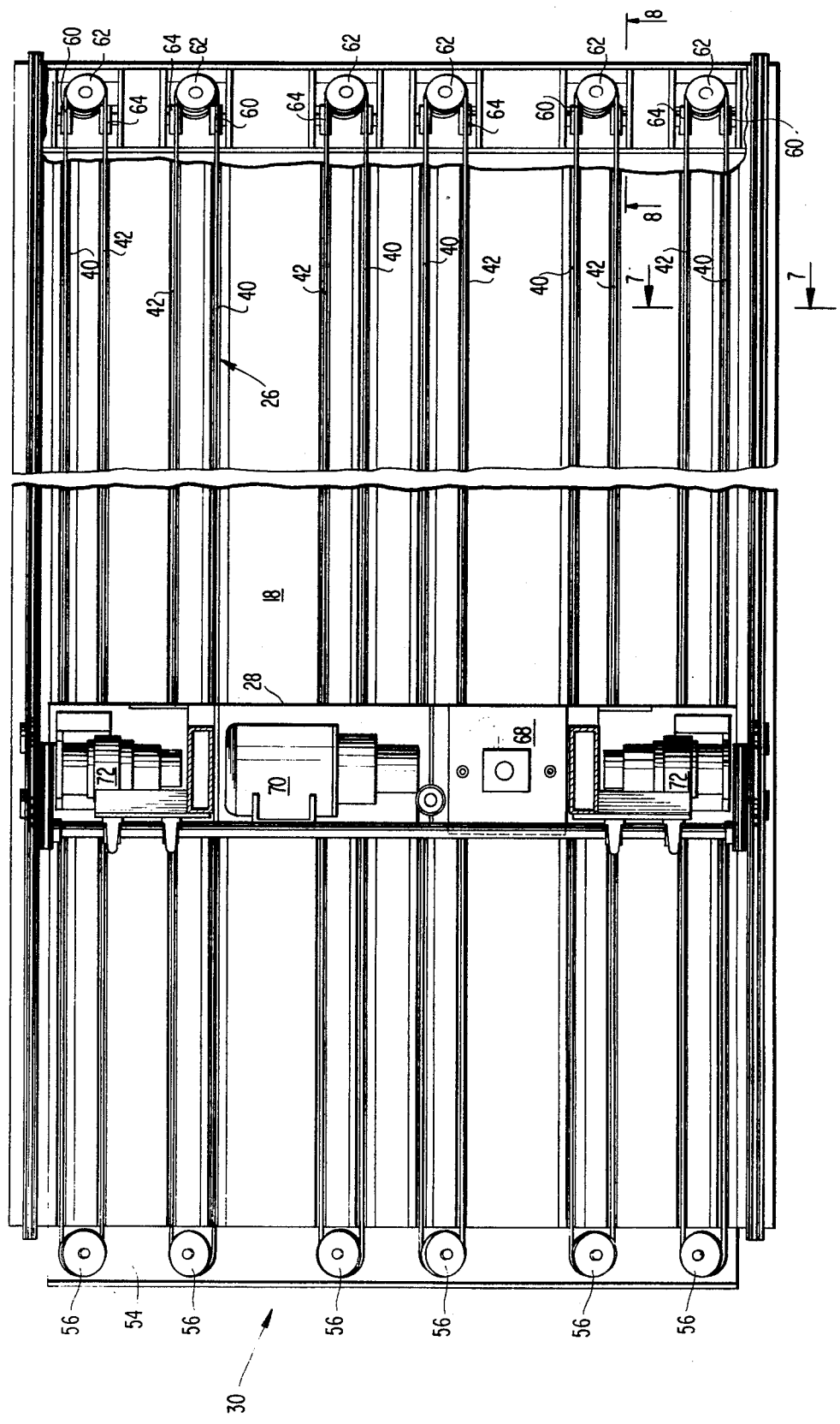
FIG. 2 is a view taken on lines 2—2 of FIG. 1.
Figure 3:
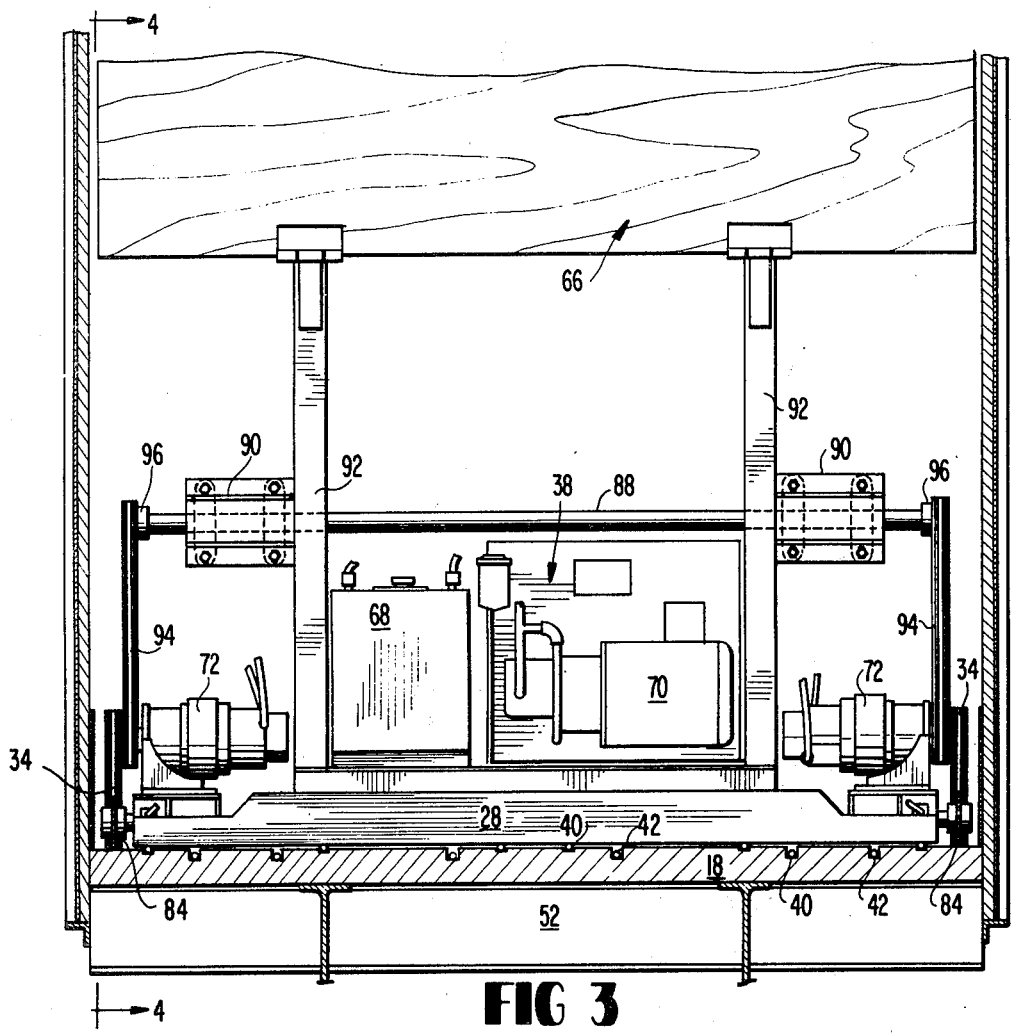
FIG. 3 is a view taken on lines 3—3 of FIG. 1.

As best seen in FIG. 2, a set of endless cables 26 extend longitudinally of the vehicle floor and through pulley units 30 and 32 at each end of the vehicle. The number of cables employed and the spacing thereof will depend upon the dimensions of the articles to be carried by the cables. Each cable includes a load supporting run 40 and a return run 42. The load supporting run 40 of each of the endless cables is attached to the beam 28 by any suitable means. Preferably, the cable is split at that point of attachment and the ends are connected to suitable connecting means which may be adjusted to adjust the tension on the individual cables. Alternatively, the cable may remain unbroken with the beam being attached thereto by suitable cable gripping elements. In any event, for the purposes of this invention, the cables are substantially endless and will be referred to as such. The important aspect to remember is that the beam 27 is attached to one of the runs of the cable, preferably the load-supporting run, such that when the beam is driven longitudinally of the vehicle, the cables will likewise be driven longitudinally of the vehicle.

As best seen in FIG. 7, a longitudinally extending channel member 44 is seated in a groove 46 cut in the upper surface 20 of the floor 18. Overlying the floor of the channel member 44 is a bearing strip 48 on which rides the load supporting run 40 of the cable 26. The upper surface of the load supporting run 40 extends above the upper surface 20 of the floor 18. Each of the other cables 26 are identical to that shown in FIG. 7. When a load is placed on the vehicle floor, it will actually rest on the load supporting runs 40 as is best illustrated in FIG. 7 wherein a load is indicated in dotted line. The return run of the cable is likewise substantially on the top surface of the floor; however, the upper surface of the return run is somewhat below the top surface of the load supporting run 40. The return run extends through a groove 50 formed in the top surface of the floor 18.

It is to be understood that the channel member 44 can be mounted on the top surface of the floor, as opposed to being mounted in a recess or groove, and the return run can, in such case, merely ride on the surface of the floor. The difference in height of the two runs would be the combined thickness of the channel floor and the bearing strip 48. Such variations in the mounting of the cables can be employed so long as the load supporting run is at least slightly above the return run.

The relative positioning of the load supporting runs and the return runs is one of the features of this invention. In prior art devices, the return runs actually go beneath the floor of the vehicle. This is undesirable in that, as applied to the vehicle shown in the drawings, if the run went beneath the floor, holes or passageways would have to be bored in the floor supporting cross beams 52 which underlie the floor, or guide tubing would have to be provided to bypass the beams and the fifth wheel connection.

Applicant has solved the problems of the prior art by placing both runs in such positions that neither of the runs has to go beneath the floor. Or, in any event, that portion of the return run overlying the fifth wheel connection would not have to go beneath the floor, (the connection providing the greatest obstacle). This is accomplished by positioning the pulleys at the front and rear end thereof in a manner such that the return run is in a plane only slightly below the plane of the load supporting run.

Figure 5:
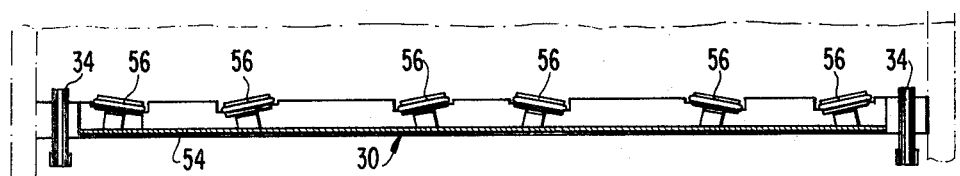
FIG. 5 is a view taken on lines 5—5 of FIG. 1.

As seen in FIGS. 2 and 5, the front end pulley unit 30 includes a supporting framework 54 which is affixed to the front end of the vehicle and extends substantially the width thereof. The framework 54 is attached exteriorly of the vehicle and the cables extend through openings in the front wall of the vehicle. This positioning of the unit 30 is most clearly shown in FIG. 1. As seen in FIG. 5, a series of pulleys 56 are journaled on the framework 54 on axes which extend at angles relative to a line perpendicular to the base of the supporting framework 54. The pulleys are identical, although half are tilted to the left of the perpendicular while the other half are tilted to the right. In any event, this tilting of the pulleys accounts for the load supporting run 40 and the return run 42 of each of the cables being in different vertical planes.

Figure 6:
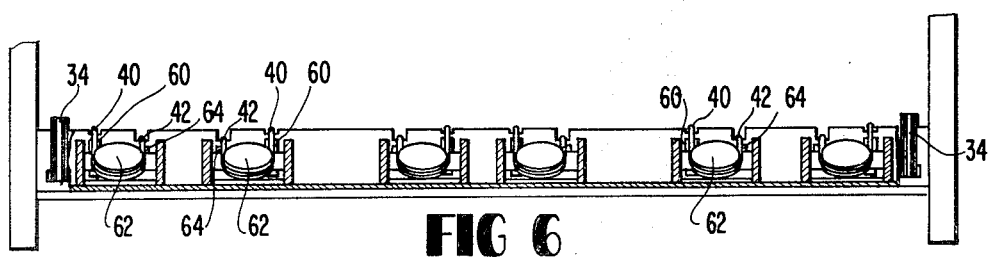
FIG. 6 is a view taken on lines 6—6 of FIG. 1.

The rear pulley unit comprises a housing 58 which is affixed to the rear of the vehicle and, as shown in FIG. 1, replaces a portion of the floor of the vehicle which is removed adjacent the end 24. The different heights of the load supporting run and the return run of each cable is accounted for by a three-pulley unit which includes, as best seen in FIG. 6, a first pulley 60, a transition pulley 62 and a pulley 64 of smaller diameter than the pulley 60. The cable extends over pulley 60 around pulley 62 and over pulley 64. The difference in diameters of the pulleys 60 and 64 accounts for the load supporting runs and the return runs of the cables being in different planes. Of course, instead of using different size pulleys, pulleys of the same size may be placed on offset axles to accomplish the same purpose.

It is to be understood that the same tilting pulley arrangement used on the front end could be used on the rear end. However, the embodiment shown in FIG. 6 is more desirable for the rear end in that the use of the tilted pulley arrangement would mean that a portion of the pulleys would extend above the floor surface and therefore, interfere with the loading and unloading functions.

While pulleys have been disclosed for reversing the direction of the cables, suitable static guides with low friction bearing surfaces may be employed. The guides are positioned in a manner to provide the height differential between the cable runs.

The beam 28 has a power unit 38 mounted thereon and is also provided with a bulkhead 66 which can assist in moving the loads. The power unit consists of a hydraulic reservoir 68 and a hydraulic pump 70 which drives rotary hydraulic motors 72 on each end of the beam 28. The means for driving the bulkhead is best seen in FIG. 4 and includes chain strips 34, laid down longitudinally of the vehicle floor along each side wall thereof. The ends 76 and 78 of the chain strips are suitably affixed to the floor or any other portion of the vehicle. A sprocket 80 is attached to the shaft 82 of each of the hydraulic motors 72. A portion of the chain strip 74 extends around idler sprockets 84 and is looped over drive sprocket 80.

Therefore, as the hydraulic motors 72 are driven, the beam will be advanced longitudinally of the vehicle as a result of the sprocket and chain internegagement.

In order to insure equal advancement of both ends of the beam, an equalizer shaft 88 is suitably journaled in brackets 90 which are mounted on vertical standards 92. Chains 94 are driven by sprockets mounted on the drive shafts 82 and extend around sprockets 96 on the ends of the equalizing shaft 88. In this manner, the beam is assured of uniform movement in its travel throughout the length of the vehicle.

As best seen in FIG. 4, the bulkhead includes a pivotal face portion 98 which can be pivoted upwardly to the position shown in FIG. 4 to expose the power unit.

Alternate embodiments of the drive means are shown in FIGS. 9 through 12. The embodiments shown in FIGS. 9 and 10 are substantially identical to the chain drive embodiment except that, in lieu of the chain, cable strips 102 are affixed to the floor of the vehicle. The cables are played around idler pulleys 104 and drive pulleys 106 which are affixed to the shafts 82 of the hydraulic motors. In order to insure good frictional contact between the cables and the pulleys 106, several turns of the cables are made around pulleys as best seen in FIG. 10.

A rack and pinion drive mechanism is shown in FIGS. 11 and 12. Toothed racks 110 are affixed to the floor. Drive gears 112 which are affixed to the shafts 82 of the hydraulic motors mesh with pinions 114 which in turn mesh with the racks 110. Rotation of the drive gears 112 will cause rotation of the pinions 114, which will cause advancement of the beam 28 and the cables attached thereto along the floor of the vehicle.

The loading and unloading operation will now be described. When loading the vehicle, the bulkhead is moved toward the rear of the vehicle but sufficient room is left to place a load on the load supporting runs 40 of the cables 26. As the beam is advanced toward the front 22 of the vehicle, the load supporting runs and the load supported thereon will be likewise drawn toward the front of the vehicle. When it is desired to unload the vehicle, the direction of movement of the beam is reversed and the loads supported on the load supporting runs of the cables 26 are advanced toward the rear of the vehicle.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

We claim:

1. A conveyor mounted on a floor, said floor having a top surface, a plurality of substantially endless load supporting flexible strands mounted in a framework on said floor, each of said endless strands having a load supporting run and a return run, a beam connected to said strands, means for moving said beam over said floor, said means for moving said beam comprises a pair of chain strips mounted on said floor and parallel to said endless strands, said chain strips having ends which are fixed to said floor, drive means for driving interengagement with each of said chain strips, said beam being operably connected to said chain strips whereby said beam and said strands are caused to move longitudinally of said floor upon actuation of said drive means.

2. The apparatus of claim 1 wherein said chain-engaging means is a sprocket.

3. The apparatus of claim 1 wherein said chain strips are mounted on the top surface of said floor.

4. The apparatus of claim 1 wherein said drive means is mounted on said beam.

5. The apparatus of claim 1 wherein said drive means is a hydraulic motor system mounted on said beam.

6. The apparatus of claim 1 wherein said drive means is an electric motor system.

7. The apparatus of claim 1 wherein said drive means is an internal combustion engine system.

8. A conveyor mounted on a floor, said floor having a top surface, a plurality of longitudinally substantially endless load supporting flexible strands mounted in a framework on said floor, each of said endless strands having a load supporting run and a return run, a beam connected to said strands, means for moving said beam over said floor, said means for moving said beam comprising a pair of drive strips mounted on said floor and parallel to said endless strands, said strips having ends which are fixed to the floor, drive means for driving engagement with each of said strips, said beam being operably connected to said strips whereby said beam and said strands are caused to move longitudinally of said floor upon actuation of said drive means.

9. The apparatus of claim 8 wherein said drive strips are sections of flexible cable.

10. The apparatus of claim 9 wherein said drive means is mounted on said beam.

11. The apparatus of claim 8 wherein said drive means includes a pulley drive means for engagement with said cable.

12. The apparatus of claim 11 wherein said pulley drive means is a hydraulic motor system mounted on said beam.

13. The apparatus of claim 12 wherein said pulley drive means is an electric motor system.

14. The apparatus of claim 12 wherein said pulley drive means is an internal combustion engine system.

* * * * *